United States Patent Office 3,082,598
Patented Mar. 26, 1963

3,082,598
ROCKET FUELS
John E. Mahan, Bartlesville, Okla., assignor to Phillips Petroleum Company, a corporation of Delaware
No Drawing. Filed Nov. 17, 1958, Ser. No. 774,556
15 Claims. (Cl. 60—35.4)

This invention relates to rocket fuels. In one aspect, this invention relates to hypergolic fuels. In another aspect, this invention relates to a method for propelling rockets.

This application is a continuation-in-part of my copending application Serial No. 366,381, filed July 6, 1953 (now Patent 2,919,541), which itself is a continuation-in-part of my application Serial No. 257,973, filed November 23, 1951, now abandoned.

My invention is concerned with new and novel rocket propellants and their utilization. A rocket or jet propulsion device, such as is discussed herein, is defined as a rigid container for matter and energy, so arranged that a portion of the matter can absorb the energy in kinetic form and subsequently eject it in a specified direction. The type rocket to which my invention is particularly applied is that type rocket propulsion device designated as a "pure" rocket, i.e., a thrust producer which does not make use of its surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber.

Rocket propellants in liquid form are advantageously utilized inasmuch as the liquid propellant materials can be carried in a light weight, low pressure vessel and thereafter be pumped into the combustion chamber. It is thus necessary that the combustion chamber, although being strong enough to stand high pressure and temperature, need be only large enough to insure combustion. The flow of liquid propellants into the combustion chamber can be regulated at will so that the thrust resulting from continuous or intermittent bursts of power can be sustained. Intermittent burning of the fuel contributes to a longer life of the combustion chamber and of the thrust nozzle.

Various methods and liquid combinations have been found to be useful as rocket propellants. Some propellants consist of a single material, and are termed "monopropellants." A monopropellant can be a homogeneous mixture of two or more materials. Those propellants involving two separate materials are termed "bipropellants" and normally consist of an oxidizer and a fuel. Hydrogen peroxide and nitromethane are each well known monopropellants. Well-known bipropellants include hydrogen peroxide or liquid oxygen as the oxidant with a fuel component such as ethyl alcohol-water, ammonia, hydrazine or hydrogen. Additional known bipropellants include nitric acid as the oxidizer with aniline or furfuryl alcohol as the hypergolic fuel component.

When employing 90–100 percent nitric acid, e.g., "white fuming nitric acid" as the oxidizer in a rocket bipropellant fuel, it is often necessary, dependent upon the specific fuel component, to obtain more effective ignition than would normally be obtained, by dissolving from 6 to 23 percent by weight of nitrogen dioxide in white fuming nitric acid, thereby forming "red fuming" nitric acid. A fuel component of the bipropellant type described herein is spontaneously ignited upon contacting the oxidizer. For this reason, such a bipropellant material is referred to herein as being "hypergolic." A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ratios, even as high as 6:1.

Each of the following objects of the invention will be obtained by the various aspects of this invention.

An object of this invention is to provide new rocket propellants. Another object of the invention is to provide a novel hypergolic fuel. Another object of the invention is to provide a method for producing immediate thrust to a rocket-type device. Another object is to provide a select superior group of polyamines which are useful as hypergolic fuels. Other and further objects will be apparent to those skilled in the art upon study of the accompanying disclosure.

In accordance with the broad aspects of the invention in said copending application Serial No. 366,381 (now Patent 2,919,541), I have found that organic polyamines, either in the presence or absence of normally liquid hydrocarbons form a fuel component which is highly "hypergolic" and suitable for use in the propulsion of rockets, guided missiles, and the like, in conjunction with an oxidizer. I have further found that these organic polyamines together with selected mercaptans, either in the presence or absence of normally liquid hydrocarbons, form a fuel component which is also highly "hypergolic" and suitable for the uses set forth above.

In accordance with the invention in said copending application Serial No. 366,381 (now Patent 2,919,541), those organic polyamines are used which contain two or more substituent

groups attached to one or more carbon atoms wherein one or both R's is selected from the group consisting of a hydrogen atom and a hydrocarbon radical and wherein the total number of carbon atoms present in said polyamine is not greater than 30. Suitable hydrocarbon radicals (those radicals which contain only hydrogen and carbon atoms) are the alkyl, alkenyl, cycloalkyl, cycloalkenyl, aryl, alkaryl, and aralkyl radicals. The carbon atoms to which the substituent

group is attached may be a cyclic (carbocyclic) carbon atom, a carbon atom of a side chain group attached to a cyclic (carbocyclic) carbon atom, or a carbon atom of an acyclic molecule.

More specifically, the fuels of the invention now being claimed in said copending application Serial No. 366,381 (now Patent 2,919,541), are composed of (1) at least one polyamine together with a selected mercaptan, or (2) at least one polyamine together with a selected mercaptan, plus a liquid hydrocarbon.

I have now discovered that certain of the organic polyamines of said copending application form a superior select group of hypergolic fuels which are superior to other polyamines (as hypergolic fuels) in that all of said superior polyamines have an ignition delay at 75° F. of less than 40 milliseconds. This superior select group of polyamines can be represented generically by the formula

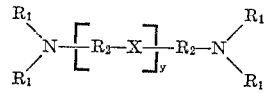

wherein each $R_1$ is selected from the group consisting of alkyl and alkenyl hydrocarbon radicals containing from 1 to 4 carbon atoms; $R_2$ is an alkylene radical containing from 1 to 3 carbon atoms; $y$ is an integer of from 1 to 2; and X is selected from the group consisting of oxygen, sulfur and a

radical.

Included among the above superior select group of hypergolic fuels represented by the above formula are the following polyamines:

N,N,N',N'-tetraethyl-1,4-diamino-3-butanol;
N,N,N',N'-tetraallyl-1,4-diamino-2-pentanol;
N,N,N',N'-tetramethyl-1,5-diamino-2,4-pentanediol;
N,N,N',N'-tetraethyl-1,3-diamino-2-oxapropane;
N,N,N',N'-tetraallyl-1,5-diamino-3-oxapentane;
N,N,N',N'-tetramethyl-1,7-diamino-4-heptanol;
N,N,N',N'-tetraethyl-1,5-diamino-2,4-dioxapentane;
N,N,N',N'-tetraallyl-1,4-diamino-2-oxabutane;
N,N,N',N'-tetraethyl-1,5-diamino-3-oxapentane;
N,N-dimethyl-N',N'-diethyl-1,3-diamino-3-thiapropane;
N,N,N',N'-tetraallyl-1,5-diamino-2,4-dithiahexane;
N,N-dimethyl-N',N'-diallyl-1,5-diamino-4-thiahexane;
N,N,N',N'-tetrabutyl-1,11-diamino-4,8-dioxahendecane;
N,N,N',N'-tetramethyl-1,9-diamino-2,6-hydroxynonane;
N,N,N',N'-tetra(3-butenyl)-1,3-diamino-2-oxapropane;
N,N,N',N'-tetramethyl-1,5-diamino-3-oxapentane;
and N,N,N',N'-tetramethyl-1,4-diamino-2-oxabutane.

All nitrogen containing compounds are not hypergolic. Indeed, all amines are not hypergolic. Table I, given below, lists a number of amine compounds which I have found are not hypergolic. In obtaining the data set forth in Table I, the test procedure employed was to add 0.13 cc. of the material to be tested to 0.30 cc. of fuming nitric acid in the bottom of an 8-inch x 1-inch Pyrex test tube. These tests were made at 75° F.

TABLE I

| | Oxidizer | |
| --- | --- | --- |
| | White Fuming Nitric Acid | Red Fuming Nitric Acid |
| di-n-propylamine | NI[1] | NI |
| cyclohexylamine | NI | NI |
| myristyldimethylamine | NI | NI |
| methylaniline | NI | NI |
| dimethylaniline | NI | NI |
| diethylaniline | NI | NI |
| di-n-butylaniline | NI | NI |
| ethanolamine | NI | NI |
| ethylmonoethanolamine | NI | NI |
| acetylmethylamine | NI | NI |
| N-diacetylallylamine | NI | NI |
| N,N,-di-n-butylbutenylamine | NI | NI |
| N-butyldibutenylamine | NI | NI |
| cetyldimethylamine | NI | NI |

[1] NI means no spontaneous ignition took place upon contact of the said amine with the oxidizer.

It is to be particularly noted that the polyamines of the invention have an ignition delay at 75° F. of less than 40 milliseconds. Ignition delay can be defined as the time interval between initial contact of the fuel and the oxidizer and the beginning of sustained combustion. Long ignition delays are undesirable in hypergolic propellant systems because they allow the accumulation of unreacted fuel and oxidizer in the rocket combustion chamber resulting in hard starts, rough burning, and sometimes destructive explosions. The data given in Table II below show that even though an amine may be hypergolic, it is not always a satisfactory hypergolic fuel. If the ignition delay is excessive the amine, or any other material, is not a good "all-purpose" hypergolic fuel. It is generally recognized by those skilled in the art that an ignition delay of about 50 milliseconds at about 75° F. is the maximum for a good "all purpose" hypergolic fuel. The data given in Table II were obtained by the drop test, the modified drop test and the impingement test procedures described hereinafter.

TABLE II

*Ignition Delay Data*

| Fuel | Oxidant | Temperature, °F. | Ignition Delay Milliseconds | Test Method |
| --- | --- | --- | --- | --- |
| Aniline | RFNA[1] | 75 | 193.9 | Modified drop test. |
| o-Toluidine | RFNA | 75 | [3] 132.4 | Do. |
| Methylamine | RFNA | 0 | [3] 373.6 | Do. |
| Ethylenediamine | WFNA[2] | 75 | 93 | Drop test. |
| Propylenediamine | WFNA | 75 | 57 | Do. |
| N,N,N',N'-tetramethyl methylene diamine. | WFNA | 75 | 95 | Do. |

[1] RFNA=red fuming nitric acid.
[2] WFNA=white fuming nitric acid.
[3] Fired only one time out of six tests.

In contrast, the data summarized in Table III below show the marked superiority of the select superior polyamines of my present invention.

TABLE III

*Ignition Delay Data*

| | Ignition Delay, Milliseconds | | |
| --- | --- | --- | --- |
| | 75° F. | 0° F. | —65° F. |
| N,N,N',N'-tetramethyl-1,3-diamino-2-propanol | 25.4 | 10.2 | 261.5 |
| N,N,N',N'-tetramethyl-1,5-diamino-3-oxapentane | 6.6 | 7.3 | 17.0 |
| N,N,N',N'-tetramethyl-1,4-diamino-2-oxabutane | 21.7 | | [1] 25.6 |

[1] At —40° F.

A comparison of the data given in Table II above with the data given in Table III shows that the ignition delay of the compounds listed in Table III is less than 40 milliseconds at 75° F. It should also be noted that the ignition delay at 75° F. of the compounds listed in Table III is less than one-third the ignition delay at 75° F. of ethylene diamine, a known hypergolic fuel listed in Table II. The difference between the ignition delay of the compounds listed in Table III and the ignition delay of aniline, another well known hypergolic fuel, is so greet that there is hardly any comparison between said aniline and said compounds of Table III. Thus, the data given in Table III above show that the class of polyamines represented by the compounds there listed is clearly and definitely superior to the hypergolic amine compounds listed in Table II.

Various methods have been developed for determining ignition delay of hypergolic fuels. Any suitable method for measuring the time interval between initial contact of the oxidant component and the fuel component and the beginning of sustained combustion can be employed. The ignition delay data reported herein were determined by two different methods: (1) employing a drop test apparatus, and (2) employing a modified drop test apparatus. Another type of apparatus sometimes used in determining ignition delay is referred to as the impingement test. In all of the forms of ignition delay test equipment employed, the apparatus broadly comprised a reaction chamber, means for contacting fuel component and oxidant component, and a timer and system for detecting time intervals between initial contact of the fuel and oxidant components and the beginning of sustained combustion.

In said impingement test, the fuel component and the oxidant component are pressured into the reaction chamber through separate lines and nozzles by means of a source of constant nitrogen pressure, usually about 40 p.s.i.g. The nozzles are oriented so that the streams of fuel component and oxidant component impinge each other. The impingement of said streams interrupts a light beam directed toward a photocell. Said photocell, when desensitized by the interruption of said light beam, actuates a timer which marks the beginning of the ignition delay period. When ignition occurs, the light from the flame is detected by another photocell which stops said timer. The thus measured time interval is the ignition delay period. Any suitable nozzle, and arrangement of nozzles, can be employed in the test apparatus. In the runs reported herein, the nozzles were orientated so that the streams of oxidant component and fuel component would impinge each other three-sixteenths of an inch from the nozzle tips.

The drop test apparatus comprises an injection nozzle inserted to within 1" of the bottom of a 1" x 8" test tube. A small quantity of fuel component (0.2 ml.), is placed in the bottom of the test tube and 0.3 ml. of oxidant component is injected into said fuel component. A constant pressure nitrogen surge chamber provides a source of approximately 40 p.s.i.g. pressure to inject the oxidizer into the fuel. The oxidant temperature is maintained constant by circulating a coolant through a jacket surrounding the injection nozzle and the fuel temperature is maintained constant by means of a constant temperature bath surrounding the test tube. A solenoid coil actuates the injector to provide an accurately metered amount of oxidant. The ignition delay interval is determined as the time interval between contact of the oxidant with the fuel and the presence of flame as sensed by a photocell. The start of the ignition delay period is obtained by sensing the electric impulse to the solenoid coil and correcting the data for a practically constant lag of 6.3±1.5 milliseconds for the oxidant to reach the fuel.

The modified drop test apparatus employed to determine some of the data given herein was identical with the drop test apparatus described above except that the apparatus was modified by installing five photocells around the combustion chamber, instead of a single photocell, to detect the flame.

The fuel constituents of the present invention, i.e., the select superior group of organic polyamines, are hypergolic in an undiluted state and are also hypergolic when admixed with non-hypergolic materials, particularly hydrocarbons, in a state of dilution as high as 30 percent by volume of diluent when red fuming nitric acid is used as the oxidant. Suitable non-hypergolic materials which also may form a portion of the fuel composition include paraffin, cycloparaffin, and aromatic hydrocarbons in the $C_5$ to $C_{30}$ range or mixtures thereof, preferably the normally liquid materials. Examples of such hydrocarbon fuels are normal pentane, normal hexane, normal heptane, benzene, kerosene, isooctane, diisopropyl, diisobutylene, cyclohexene, cyclohexane, isodecane, methylcyclohexane, toluene, hexadecane, eicosane, hexacosane, pentatricontane, picene, cyclononacosane, liquid jet fuels such as JP–4, etc., and the like. Hydrocarbons in the $C_5$ to $C_{16}$ range are preferred.

The following Table IV summarizes results of dilution tests which were run to determine the maximum permissible dilution at which representative polyamines of the invention would retain their hypergolicity when diluted with various hydrocarbons. The tests reported in Table IV wherein JP–4 jet fuel was used as the diluent were run in accordance with the modified drop test described above. The tests wherein toluene was used as the diluent were run by dropping 0.3 ml. of acid into 0.2 ml. of diluted amine in a 1" x 8" test tube and observing whether or not spontaneous ignition occurred.

TABLE IV

*Dilution Tolerance of Polyamine Hypergolic Fuels*

| Amine | Diluent | Maximum Permissible Dilution @ 75° F., Vol. percent |
|---|---|---|
| N,N,N',N'-tetramethyl-1,3-diamino-2-propanol. | JP–4 [1] | 30 |
| Do | Toluene | 30 |
| N,N,N',N'-tetramethyl-1,5-diamino-3-oxapentane. | JP–4 [1] | 20 |
| Do | Toluene | 20 |

[1] See Table V below.

The jet fuel used in the tests given in Table IV above had the following properties.

TABLE V

*JP–4 Jet Fuel*

Distillation, ° F.:
 IBP _____ 162
 5% Evap _____ 218
 10% Evap _____ 240
 20% Evap _____ 266
 30% Evap _____ 299
 40% Evap _____ 312
 50% Evap _____ 331
 60% Evap _____ 358
 70% Evap _____ 381
 80% Evap _____ 408
 90% Evap _____ 443
 95% Evap _____ 468
 EP _____ 500

Residue, volume percent _____ 1.0
Loss, volume percent _____ 0.0
Existant gum, mg./100 ml _____ 1.7
Potential gum, mg./100 ml _____ 1.8
Freeze point, ° F _____ 70
Reid vapor pressure, p.s.i _____ 1.8
Density, gm./cc. @ 20° F _____ 0.772
Sulfur, total, weight percent _____ 0.109
Aniline point, ° F _____ 128.5
Aromatics, volume percent _____ 13.2
Bromine number _____ 1.1
Smoke point, mm _____ 24.5
Smoke volatility index _____ 56.8

The polyamines of the invention are known compounds and can be prepared by any suitable method. In one method of preparation, a dialkyl aminoalkyl halide or a dialkenyl aminoalkyl halide is reacted with a metal alcoholate, such as the sodium salt of a dialkyl aminoalkanol. Similarly, said halides can be reacted with mercaptans. These reactions can be conducted in an inert hydrocarbon solvent, such as benzene, and under anhydrous conditions. Reaction temperatures in the range of 10 to 200° C. for periods of 1 to 50 hours give good yields. The resulting ethers can be recovered by distillation. As an illustration of this process, a benzene solution of 2-chloro-N,N-dimethylethylamine can be mixed with a benzene solution of dimethylaminoethanol which has been converted to the sodium salt by reaction with metallic sodium. The mixture is refluxed. After removal of sodium chloride by filtration, the product, N,N,N',N'-tetramethyl-1,5-diamino-3-oxapentane, can be recovered by distillation.

In still another method of preparation, epichlorohydrins can be reacted with secondary amines. For this reaction, an excess of the amine is generally preferred, e.g., 2 to 10 mols of amine per mol of epichlorohydrin. The reaction can be conveniently effected in benzene solution at temperatures of 15 to 150° C. Pressure is applied when necessary to maintain the reactants in liquid phase. The hydrochloride salts of the amines which are formed can be neutralized with sodium hydroxide. The liberated amines can then be recovered and purified by distillation.

While the invention has been described employing white fuming and red fuming nitric acids, other oxidants are suitable oxidants for these hypergolic fuels in addition to white or red fuming nitric acid and can be used in the bipropellant fuel compositions of our invention. Suitable oxidants include materials such as hydrogen peroxide, ozone, nitrogen tetroxide, liquid oxygen and mixed acids, especially anhydrous mixtures of nitric and sulfuric acids such as 80 to 90 percent by volume of white or red fuming nitric acid and 10 to 20 percent by volume anhydrous or fuming sulfuric acid. It is within the scope of this invention to employ, preferably dissolved in the oxidizer ignition catalysts or oxidation catalysts. These oxidation catalysts include certain metal salts, such as the chlorides and naphthenates of iron, zinc, cobalt and similar heavy materials.

As will be evident to those skilled in the art, various modifications, substitutions, and changes may be made or followed in the light of the foregoing disclosure without departing from the spirit or scope of the invention.

I claim:

1. In the method for developing thrust by the combustion of bipropellant components in a combustion chamber of a reaction motor, the steps comprising separately and simultaneously injecting a stream of an oxidant component and a stream of a fuel component into a combustion chamber of said motor in such proportions as to produce spontaneous ignition, said fuel component consisting essentially of at least one polyamine having the formula

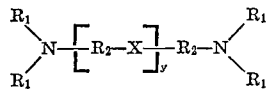

wherein: each $R_1$ is selected from the group consisting of alkyl and alkenyl hydrocarbon radicals containing from 1 to 4 carbon atoms; $R_2$ is an alkylene radical containing from 1 to 3 carbon atoms; $y$ is an integer of from 1 to 2; and X is selected from the group consisting of oxygen, sulfur and an

radical.

2. A method according to claim 1 wherein said fuel component is N,N,N',N'-tetramethyl-1,3-diamino-2-propanol.

3. A method according to claim 1 wherein said fuel component is N,N,N',N'-tetramethyl-1,5-diamino-3-oxapentane.

4. A method according to claim 1 wherein said fuel component is N,N,N',N'-tetramethyl-1,4-diamino-2-oxabutane.

5. A method according to claim 1 wherein said fuel component is N,N,N',N'-tetramethyl-1,3-diamino-2-oxapropane.

6. A method according to claim 1 wherein said fuel component is N,N,N',N'-tetramethyl-1,3-diamino-3-pentanol.

7. A fuel composition capable of spontaneous ignition when contacted with an oxidant, said fuel consisting essentially of at least 70 percent by volume of at least one polyamine having the formula

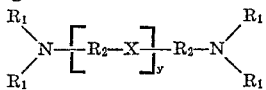

wherein: each $R_1$ is selected from the group consisting of alkyl and alkenyl hydrocarbon radicals containing from 1 to 4 carbon atoms; $R_2$ is an alkylene radical containing from 1 to 3 carbon atoms; $y$ is an integer of from 1 to 2; and X is a

radical; and a normally liquid hydrocarbon in an amount up to 30 percent by volume.

8. A fuel composition according to claim 7 wherein said polyamine is N,N,N',N'-tetramethyl-1,3-diamino-2-propanol.

9. A fuel composition according to claim 7 wherein said polyamine is N,N,N',N'-tetramethyl-1,3-diamino-3-pentanol.

10. In the method for developing thrust by the combustion of bipropellant components in a combustion chamber of a reaction motor, the steps comprising separately and simultaneously injecting a stream of an oxidant component and a stream of a fuel component into a combustion chamber of said motor in such proportions as to produce spontaneous ignition, said fuel component consisting essentially of at least 70 percent by volume of at least one polyamine having the formula

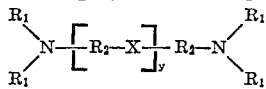

wherein: each $R_1$ is selected from the group consisting of alkyl and alkenyl hydrocarbon radicals containing from 1 to 4 carbon atoms; $R_2$ is an alkylene radical containing from 1 to 3 carbon atoms; $y$ is an integer of from 1 to 2; and X is selected from the group consisting of oxygen, sulfur and an

radical; and a normally liquid hydrocarbon in an amount up to 30 percent by volume.

11. A method according to claim 10 wherein said polyamine is N,N,N',N'-tetramethyl-1,3-diamino-2-propanol.

12. A method according to claim 10 wherein said polyamine is N,N,N',N'-tetramethyl-1,5-diamino-3-oxapentane.

13. A method according to claim 10 wherein said polyamine is N,N,N',N'-tetramethyl-1,4-diamino-2-oxabutane.

14. A method according to claim 10 wherein said polyamine is N,N,N',N'-tetramethyl-1,3-diamino-2-oxapropane.

15. A method according to claim 10 wherein said polyamine is N,N,N',N'-tetramethyl-1,3-diamino-3-pentanol.

References Cited in the file of this patent

UNITED STATES PATENTS

| | | |
|---|---|---|
| 2,282,710 | Dietrich | May 12, 1942 |
| 2,573,471 | Malina et al. | Oct. 30, 1951 |
| 2,716,134 | Reynolds et al. | Aug. 23, 1955 |